United States Patent [19]

Mittell et al.

[11] Patent Number: 5,429,149

[45] Date of Patent: Jul. 4, 1995

[54] VALVE ASSEMBLY

[75] Inventors: Larry Mittell, Palos Verdes Estates; James Wada, Torrance, both of Calif.

[73] Assignee: Eaton Corporation, Cleveland, Ohio

[21] Appl. No.: 213,687

[22] Filed: Mar. 16, 1994

[51] Int. Cl.⁶ .......................................... F16K 31/128
[52] U.S. Cl. ...................................... 137/2; 137/396; 137/488; 137/899.2
[58] Field of Search ................. 137/2, 488, 396, 899.2

[56] References Cited

U.S. PATENT DOCUMENTS 2,477,247  7/1949  Haberland ........................... 137/488
3,998,736 12/1916  Greanleaf ....................... 137/396 X

OTHER PUBLICATIONS

Component Maintenance Manual 9350024, p. 2, dated Nov. 9, 1987.

*Primary Examiner*—Robert G. Nilson
*Attorney, Agent, or Firm*—Tarolli, Sunheim & Covell

[57] ABSTRACT

A valve assembly is provided to control a flow of liquid through a drain conduit from a sink in an aircraft. When the aircraft is in an inactive condition on the ground, a fluid motor presses a main valve member lightly against a main valve seat. At this time, liquid in the drain conduit can leak past the main valve member. However, at this time, the main valve member is effective to block a reverse flow of odors through the drain line into the cabin of the aircraft. When the aircraft is operating in the air above the ground, the motor presses the main valve member against the main valve seat with sufficient force to seal the drain conduit and prevent the leakage of fluid past the main valve seat. When a predetermined amount of liquid has accumulated in the drain conduit upstream from the main valve seat, a motor control assembly effects operation of the motor to move the main valve member away from the main valve seat to allow the liquid to flow through the drain conduit past the main valve seat.

10 Claims, 2 Drawing Sheets

5,429,149

VALVE ASSEMBLY

BACKGROUND OF THE INVENTION

The present invention relates to a new and improved valve assembly for use in an aircraft to control a flow of liquid through a drain conduit.

Lavatory and galley sink drains in an aircraft are commonly plumbed overboard or to a vacuum holding tank in either case, ambient cabin air will continuously flow down the open drain. The flow of cabin air through the drain creates an objectionable noise. In addition, the loss cabin air may create a slight turbine engine horsepower loss. When the aircraft is in an inactive condition on the ground, there may be a tendency for odors to reverse flow back up the sink drain line resulting in an odor problem in the galley or lavatory.

SUMMARY OF THE INVENTION

The present invention relates to a new and improved valve assembly and to the method in which the valve assembly is used in an aircraft to control flow of liquid through a drain conduit. The valve assembly includes a motor which is operable to press a main valve member against a main valve seat and to move the main valve member away from the main valve seat.

When the aircraft is in an inactive condition on the ground, the motor presses the main valve member against the main valve seat with a relatively small force. This enables liquid in the drain conduit to leak past the main valve member.

When a downstream portion of the drain conduit is connected in fluid communication with a source of low pressure, a motor control assembly is operable to effect operation of the motor to press the main valve member against the main valve seat with a substantially greater force to block flow of liquid through the main valve seat. When the amount of liquid in a portion of the drain conduit upstream from the main valve seat exceeds a predetermined amount, a motor control assembly is operable to effect operation of the motor to move the main valve member away from the main valve seat to enable liquid to flow through the drain conduit.

BRIEF DESCRIPTION OF THE DRAWINGS

The foregoing and other features of the invention will become more apparent upon a consideration of the following description taken in connection with the accompanying drawings wherein.

DESCRIPTION OF ONE SPECIFIC PREFERRED EMBODIMENT OF THE INVENTION

General Description

Figure 1:
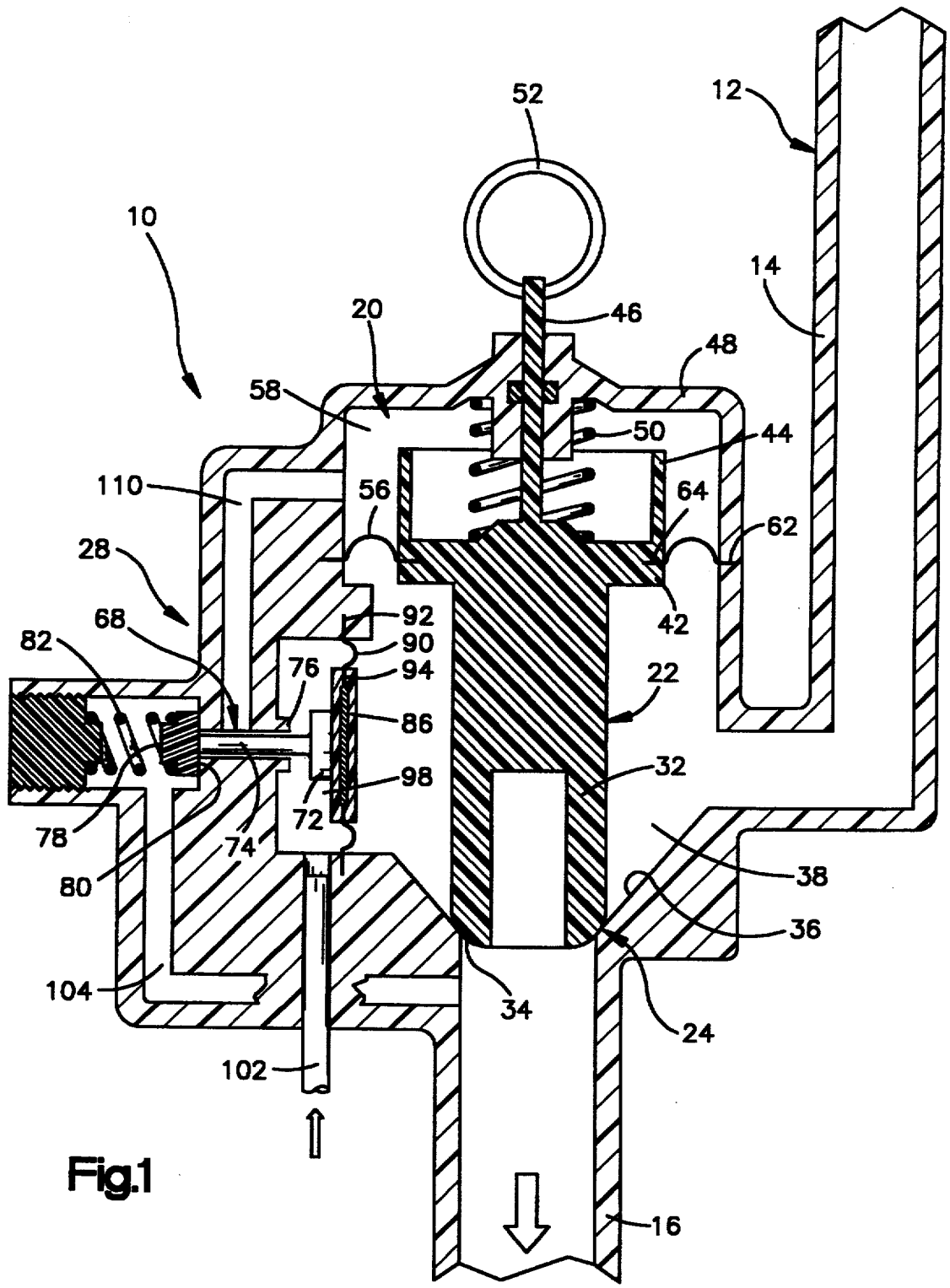
FIG. 1 is a sectional view of a valve assembly constructed in accordance with the present invention, the valve assembly being shown in a closed condition.

A valve assembly 10 (FIG. 1) is connected with a drain conduit 12 in an aircraft. The drain conduit 12 is connected with a sink in the aircraft. The sink may be either a galley sink or a lavatory sink. Thus, a portion 14 of the drain conduit 12 upstream from the valve assembly 10 is connected with an outlet from the sink. Of course, the valve assembly 10 may be used with drain conduits other than sink drain conduits.

A portion 16 of the drain conduit 12 downstream from the valve assembly 10 is either plumbed overboard or is connected with a vacuum holding tank. In either case, the downstream portion 16 of the drain conduit 12 is connected with a source of low pressure when the aircraft is operating in the air above the ground. The source of low pressure with which the downstream portion 16 of the drain conduit is connected in fluid communication may be the air around the aircraft or vacuum from a holding tank on the aircraft.

When the aircraft is in an inactive condition on the ground, a fluid motor 20 presses a main valve member 22 lightly against a main valve seat 24. At this time, the force with which the fluid motor 20 presses the main valve member 22 against the main valve seat 24 is effective to prevent a reverse or back flow of odors from the downstream portion 16 of the drain conduit 12. However, the force with which the main valve member 22 is pressed against the main valve seat 24 by the fluid motor 20 is ineffective to prevent leakage of water between the main valve member 22 and the main valve seat 24. Therefore, when the aircraft is in an inactive condition on the ground, any water which is in the upstream portion 14 of the drain conduit 12 will leak past the main valve member 22 and through the main valve seat 24 to the downstream portion 16 of the drain conduit.

When the aircraft is operating in the air above the ground, the fluid motor 20 presses the main valve member 22 firmly against the main valve seat 24. At this time, the fluid motor 20 presses the main valve member 22 against the main valve seat 24 with sufficient force to form a fluid tight seat. Therefore, the main valve member 22 is effective to block a flow of cabin air from the upstream portion 14 of the drain conduit 12 past the main valve member 22 and through the main valve seat 24. Since cabin air cannot flow past the main valve member 22 to the downstream portion 16 of the drain conduit 12, there is no objectionable loud sucking or whistling noise.

While the aircraft is in the air, water may accumulate in the sink and drain conduit 12. The fluid tight seat between the main valve member 22 and main valve seat 24 blocks a flow of water through the main valve seat. When a predetermined amount of water has accumulated in the upstream portion 14 of the drain conduit 12, a control assembly 28 effects operation of the fluid motor 20 to move the main valve member 22 away from the main valve seat 24 (FIG. 2).

When the main valve member 22 has been moved away from the main valve seat 24, the water in the upstream portion 14 of the drain conduit 12 can flow past the main valve member and through the main valve seat to the downstream portion 16 of the drain conduit. When the amount of water in the upstream portion 14 of the drain conduit 12 has decreased to the predetermined amount, the control assembly 28 effects operation of the fluid motor 20 to move the main valve member 22 into sealing engagement with the main valve seat 24. This enables the main valve member 22 to again block the flow of liquid from the upstream portion 14 of the drain conduit 12 to the downstream portion 16 of the drain conduit.

Figure 2:
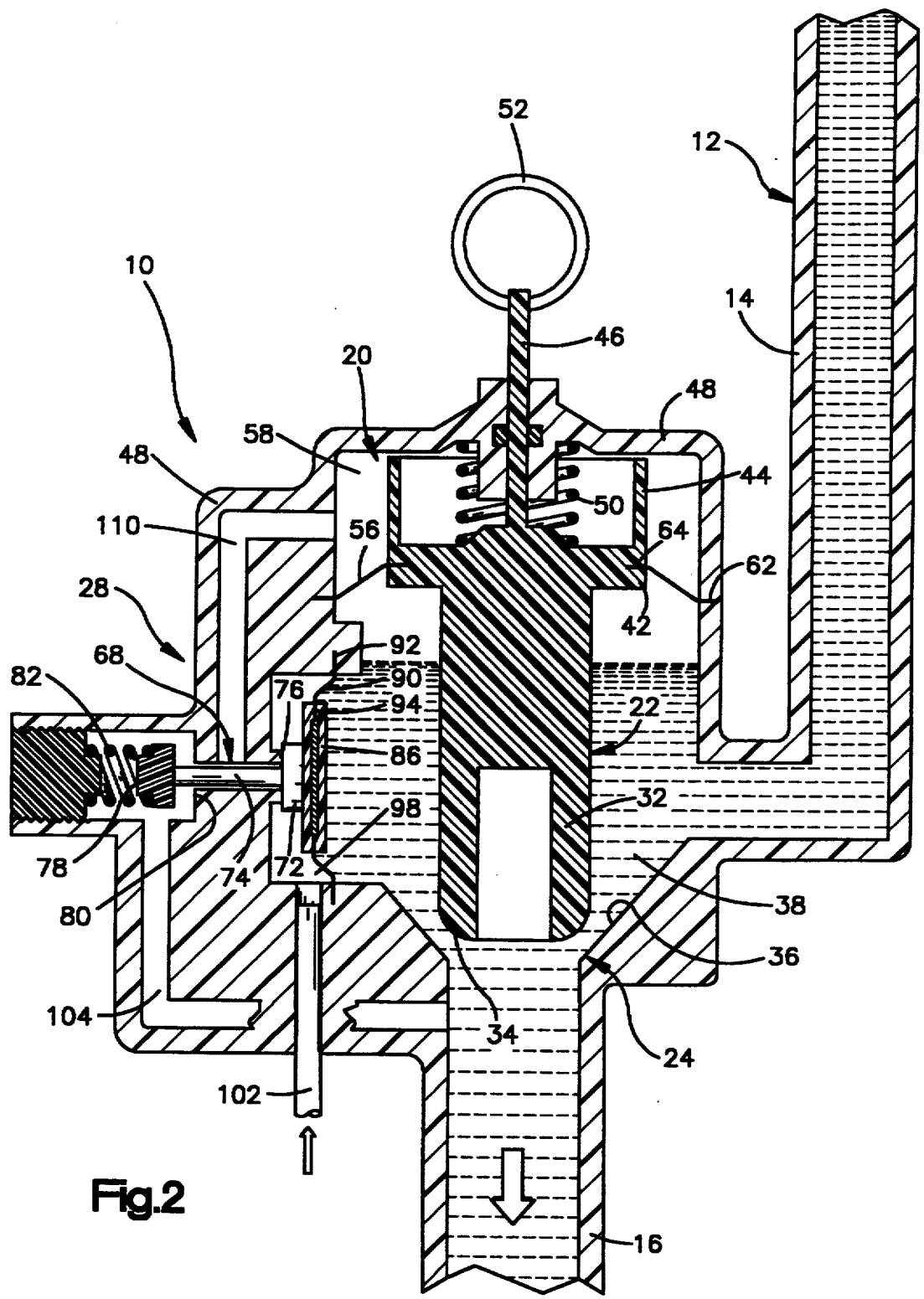
FIG. 2 is a sectional view generally similar to FIG. 1, illustrating the valve assembly in an open condition.

In one specific embodiment of the valve assembly 10, the control assembly 28 effects operation of the fluid motor 20 to move the main valve member 22 from the closed position of FIG. 1 to the open position of FIG. 2 when the level of the water in the upstream portion 14 of the drain conduit 12 is ten inches above the main valve seat 24. It should be understood that the control assembly 28 and fluid motor 20 may be constructed to effect movement of the main valve member 22 when any desired amount of liquid has accumulated in the drain conduit 12.

When the aircraft returns to the ground and is in an inactive condition, the downstream portion 16 of the drain conduit 12 is connected in fluid communication with ambient air pressure. When this occurs, the motor 20 is again effective to press the main valve member 22 lightly against the valve seat 24. This enables any water which has accumulated in the upstream portion 14 of the drain conduit 12 to leak past the main valve seat 24.

Main Valve

The main valve member 22 is formed of a polymeric material and has a cylindrical body 32. The cylindrical body 32 has a rounded lower (as viewed in FIG. 1) end portion 34 which is pressed against the main valve seat 24. The main valve seat 24 has a surface 36 which is formed as a portion of a cone.

When the end portion 34 of the main valve member 22 is pressed lightly against the surface 36 of the main valve seat 24 by the fluid motor 20, water may accumulate in a valve chamber 38 in which the main valve member is disposed. However, the pressure with which the end portion 34 of the main valve member 22 is pressed against the main valve seat 24 is insufficient to maintain the end portion 34 of the main valve member 22 in sealing engagement with the main valve seat 24. Therefore, the pressure of the water against the rounded end portion 34 of the main valve member 22 is sufficient to enable the water to leak slowly from the valve chamber 38 through the main valve seat 24 to the downstream portion 16 of the drain conduit.

The main valve member 24 has a circular flange 42 at the upper end of the body 32. A cylindrical stop wall 44 extends axially upward from the flange 42. The stop wall 44 is engageable with a housing 48 to limit upward movement of the main valve member 22.

A cylindrical stem 46 is disposed in a coaxial relationship with the stop wall 44, flange 42 and body 32 of the main valve member 22. The stem 46 extends through the housing 48 which encloses the main valve 22 and forms the valve chamber 38. The body 32, flange 42, stop wall 44 and stem 46 of the main valve member 22 may be formed as a single piece of polymeric material.

A coil spring 50 extends between the flange 42 and the housing 48. The spring 50 is effective to press the main valve member 22 lightly against the main valve seat 24. An override ring 52 is connected with the stem 46. The override ring 52 may be manually pulled to move the main valve member 22 away from the main valve seat 24.

Motor

The fluid motor 20 is disposed in the housing 48 with the main valve member 22. The fluid motor 20 includes a flexible annular main or power diaphragm 56 which extends between the housing 48 and the main valve member 22. The diaphragm 56 cooperates with the housing 48 to form a motor chamber 58. The motor chamber 58 has a generally cylindrical configuration and is formed by the housing 48, the diaphragm 56., and the flange 42 on the main valve member 22.

The main or power diaphragm 56 has a circular outer rim portion 62 which is fixedly secured to the housing 48. The diaphragm 56 has a circular inner rim portion 64 which is fixedly secured to the flange 42 of the main valve member 22. The diaphragm 56 is readily flexed to accommodate movement of the main valve member 22 from the closed position of FIG. 1 to the open position of FIG. 2.

Control Assembly

The control assembly 28 is disposed in the housing 48 along with the fluid motor 20 and the main valve member 22. The control assembly 28 includes a control valve 68. The control valve 68 has a first cylindrical valve portion 72 which is connected with a cylindrical valve stem 74.

The first valve portion 72 is movable from the open position shown in FIG. 1 to the closed position shown in FIG. 2 to block fluid flow through an annular control valve seat 76. When the valve portion 72 is in the open position shown in FIG. 1, fluid can flow through the valve seat 76 and an annular passage which extends around the valve stem 74.

A second cylindrical valve portion 78 is connected with the end of the valve stem 74 opposite from the first valve portion 72. The second valve portion 78 is engageable with a flat annular valve seat 80 formed on the housing 48. When the second valve portion 78 is in the closed position of FIG. 1, the second valve portion blocks fluid flow through a circular opening in the valve seat 80. However, when the second valve portion 78 is in the open position of FIG. 2, fluid can flow through the valve seat 80 and along the annular passage which extends along valve stem 74 between the valve seats 76 and 80. A coil spring 82 presses the valve portion 78 against the valve seat 80.

The valve portions 72 and 78 are disposed is a coaxial relationship and are fixedly interconnected by the valve stem 74. A central axis of the valve stem 74 is coincident with central axes of circular openings in the valve seats 76 and 80. The valve stem 74 has a diameter which is less than the diameters of the circular openings in the valve seats 76 and 80.

The control valve 68 is moved from the initial position shown in FIG. 1 to the actuated position shown in FIG. 2 under the influence of pressure against a circular head portion 86 which is fixedly connected with the first valve portion 72. The control valve 68 is also moved from the initial position to the actuated position under the influence of fluid pressure against a flexible annular diaphragm 90. The diaphragm 90 extends between the head portion 86 of the control valve 68 and the housing 48.

The control valve diaphragm 90 has a circular outer rim 92 which is secured to the housing 98 and a circular inner rim 94 which is secured to the head portion 86 of the control valve 68. The diaphragm 90 and head portion 86 of the control valve 68 cooperate with the housing 48 to form a cylindrical control chamber 98.

When the combined force of the fluid pressure in the control chamber 98 and the coil spring 82 exceeds the force of the fluid pressure in the valve chamber 38 on the head portion 86 of the control valve 68 and the diaphragm 90, the valve portion 78 sealingly engages the valve seat 80 (FIG. 1). When the force of the fluid pressure in the valve chamber 38 exceeds the combined force of the fluid pressure in the control chamber 98 and spring 92, the valve portion 72 sealingly engages the valve seat 76.

Cabin air pressure is conducted to the control chamber 98 through a conduit 102. Fluid pressure from the downstream portion 16 of the drain conduit 12 is conducted to the valve seat 80 through a low pressure conduit 104. When the aircraft is in an inactive condition on the ground, the cabin air pressure conducted to the control chamber 98 through the conduit 102 will be the same as the fluid pressure conducted from the downstream portion 16 of the drain conduit 12 to the valve seat 80 through the low pressure conduit 104. However, when the aircraft is operating in the air above the ground, the downstream portion 16 of the drain conduit 12 is connected in fluid communication with the low pressure air surrounding the aircraft or is connected in fluid communication with a source of low pressure or vacuum at a holding tank. At this time, the fluid pressure conducted through the conduit 104 will be substantially less than the cabin air pressure conducted through the conduit 102.

Fluid pressure is conducted from the valve stem 74 to the motor chamber 20 through a motor conduit 110. When the control valve 68 is in the initial position of FIG. 1, cabin air pressure is conducted along the valve stem 74 to the motor conduit 110. When the control valve 68 is in the actuated position of FIG. 2, low pressure is conducted from the downstream portion 16 of the drain conduit 12 along the valve stem 74 to the motor conduit 110.

Operation

When the aircraft is in an inactive condition on the ground, the downstream portion 16 of the drain conduit 12 is connected with the ambient air pressure around the aircraft. At this time, the cabin pressure in the aircraft is the same as the ambient pressure around the aircraft. Therefore, the ambient air pressure around the aircraft is conducted from the cabin to the control chamber 98 through the conduit 102. At this time, the control valve 68 is held in the initial position indicated in FIG. 1 by the spring 82. The ambient cabin air pressure is conducted through the valve seat 76 and motor conduit 110 to the motor chamber 58.

The upstream portion 14 of the drain conduit 12 and the valve chamber 38 are connected with the ambient cabin air pressure. Therefore, when the aircraft is in an inactive condition on the ground, the fluid pressure in the motor chamber 58 above the main diaphragm 56 is the same as the fluid pressure in the valve chamber 38. This results in the main valve member 22 being pressed lightly against the main valve seat 24 by the spring 50.

Any water which may accumulate in the upstream portion 14 of the drain conduit 12 will leak past the main valve member 22 and through the main valve seat to the downstream portion 16 of the drain conduit 12. Therefore, an accumulation of water will not remain in either the drain conduit 12 or the sink with which the drain conduit is connected. The seal between the main valve member 22 and the valve seat 24 is sufficient to prevent odors from being conducted upward through the main valve seat 24 and the drain conduit 12 to a sink in a galley or lavatory when the aircraft is in the inactive condition on the ground.

After takeoff, as the aircraft gains altitude, the cabin air pressure conducted through the conduit 102 to the control chamber 98 will exceed the relatively low fluid pressure in the downstream portion 16 of the drain conduit 12. The relatively high cabin air pressure is conducted from the control chamber 98 through the open control valve seat 76 and motor conduit 110 to the motor chamber 58. The cabin air pressure applied against the flange 42 at the upper end of the main valve member 22 and the diaphragm 56 is effective to press the end portion 34 of the main valve member 22 firmly against the main valve seat 24. This results in a fluid tight seal being formed between the end portion 34 of the main valve member 22 and the main valve seat 24. Therefore, cabin air pressure cannot be vented through the valve assembly 10.

During normal flight operations, that is at altitudes above 8,000 feet, the motor 20 presses the main valve member 22 firmly against the main valve seat 24. This is because the lower end portion 34 of the main valve member 22 is exposed to the relatively low pressure in the downstream portion 16 of the drain conduit 12 and the upper end portion of the main valve member is exposed to the relatively high fluid pressure in the motor chamber 58. Of course, the valve assembly 10 could be designed so that the cabin air pressure would maintain the valve assembly in a closed condition at any desired altitude at which the cabin air pressure exceeds the fluid pressure in the downstream portion 16 of the drain conduit 12.

When the aircraft is operating a normal altitude, that is above 8,000 feet, water may flow from the sink into the drain conduit 12. The water is conducted downward in the drain conduit into the valve chamber 38 (FIG. 2). When the amount of water in the upstream portion 14 of the drain conduit 12 exceeds a predetermined amount, the control assembly 28 is effective to connect the motor chamber 58 with the relatively low fluid pressure in the downstream portion 16 of the drain conduit 12. When this occurs, the relatively high fluid pressure in the valve chamber 38 causes the diaphragm 56 to move the main valve member 22 upward to the open position of FIG. 2.

Thus, as water begins to accumulate in the valve chamber 38, air is trapped between the diaphragm 56 and the upper surface of the body of water in the valve chamber 38 (FIG. 2). As water continues to accumulate in the drain conduit 12, the pressure applied against the control diaphragm 90 and the head portion 86 of the control valve 68 by the water (FIG. 2) moves the first valve portion 72 into engagement with the valve seat 76 and moves the second valve portion 78 away from the valve seat 80. Engaging the valve seat 76 with the first valve portion 72 blocks the conduction of cabin air pressure from the control chamber 98 to the motor chamber 58 through the motor conduit 110. At the same time, the relatively low fluid pressure in the downstream portion 16 of the drain conduit 12 is conducted through the valve seat 80 to the motor conduit 110 and the motor chamber 58.

As the fluid pressure in the motor chamber 58 is reduced to the relatively low fluid pressure in the downstream portion 16 of the drain conduit 12, the fluid pressure in the valve chamber 38 is effective to move the diaphragm 56 and the main valve member 22 upward. This results in the main valve member 22 being moved from the closed position of FIG. 1 to the open position of FIG. 2. When the main valve member 22 is in the open position of FIG. 2, water can flow from the sink and the upper portion 14 of the drain conduit. 12 through the main valve seat 24 to the lower portion 16 of the drain conduit.

When the amount of water in the drain conduit 12 has been reduced to a predetermined amount, the pressure applied against the head portion 86 of the control valve 68 and the diaphragm 90 will be ineffective to compress the spring 82. The spring 82 will then move the first valve portion 72 away from the valve seat 76 and move the second valve portion 78 into engagement with the valve seat 74. This results in the motor chamber 58 again being connected with cabin air pressure through the motor conduit 110 and valve seat 76. When this occurs, the fluid pressure in the motor chamber 58 moves the main valve member 22 back to the closed position of FIG. 1.

Conclusion

In view of the foregoing description it is apparent that the present invention relates to a new and improved valve assembly 10 and to the method in which the valve assembly is used in an aircraft to control flow of liquid through a drain conduit 12. The valve assembly 10 includes a motor 20 which is operable to press a main valve member 22 against a main valve seat (FIG. 1) and to move the main valve member away from the main valve seat.

When the aircraft is in an inactive condition on the ground, the motor 20 presses the main valve member 22 against the main valve seat 24 with a relatively small force. This enables liquid in the drain conduit 12 to leak past the main valve member 22.

When a downstream portion of the drain conduit is connected in fluid communication with a source of low pressure, a motor control assembly is operable to effect operation of the motor 20 to press the main valve member 22 against the main valve seat 24 with a substantially greater force to block the flow of liquid through the main valve seat. When the amount of liquid in a portion 14 of the drain conduit 12 upstream from the main valve seat 24 exceeds a predetermined amount, a motor control assembly 28 is operable to effect operation of the motor 20 to move the main valve member 22 away from the main valve seat 24 to enable liquid to flow through the drain conduit 12.

From the above description of the invention, those skilled in the art will perceive improvements, changes and modifications. Such improvements, changes and modifications within the skill of the art are intended to be covered by the appended claims.

Having described the invention, the following is claimed:

1. A valve assembly for use in an aircraft to control flow of liquid through a drain conduit, said valve assembly comprising a main valve seat through which liquid flows from a portion of the drain conduit upstream of the valve seat to a portion of the drain conduit downstream of the valve seat, a main valve member, motor means connected with said main valve member for pressing said main valve member against said main valve seat with a first force which is relatively small to enable liquid in the drain conduit to leak past said main valve member when the aircraft is in an inactive condition on the ground, and control means for effecting operation of said motor means to press said main valve member against said main valve seat with a second force which is substantially greater than the first force to completely block liquid flow through said main valve seat when the downstream portion of the drain conduit is connected in communication with a source of low pressure and there is less than a predetermined amount of liquid in the upstream portion of the drain conduit to block liquid flow through the main valve seat from the upstream portion of the drain conduit to the downstream portion of the drain conduit, said control means being operable to effect operation of said motor means to move said main valve member away from said valve seat when the amount of liquid in the upstream portion of the drain conduit exceeds the predetermined amount and the drain conduit is connected with the source of low pressure to enable liquid to flow from the upstream portion of the drain conduit to the downstream portion of the drain conduit.

2. A valve assembly as set forth in claim 1 wherein said motor means is operated under the influence of fluid pressure, said control means including control valve means for connecting said motor means in fluid communication with the downstream portion of said drain conduit to effect operation of said motor means to move said main valve member away from said valve seat.

3. A valve assembly as set forth in claim 1 wherein said motor means is operated under the influence of fluid pressure in the upstream portion of the drain conduit to move said main valve member away from said main valve seat.

4. A valve assembly as set forth in claim 1 wherein said control means includes control valve means operable between a first condition and a second condition, said control valve means including first surface means for directing relatively high pressure to said motor means when said control valve means is in the first condition, said control valve means including second surface means for directing relatively low pressure from the downstream portion of the drain conduit to said motor means when said control valve means is in the second condition, said motor means being operable under the influence of a fluid pressure differential between the relatively low fluid pressure conducted from the downstream portion of said drain conduit to said motor means through said control valve means when said control valve means is in the second condition and a relatively high fluid pressure in the upstream portion of said drain conduit when the predetermined amount of liquid is present in the upstream portion of the drain conduit.

5. A valve assembly as set forth in claim 1 wherein said valve assembly includes a housing having a lower portion in which said main valve seat is disposed, said motor means including a main diaphragm disposed in an upper portion of said housing above said main valve seat and connected with an upper portion of said main valve member, said main diaphragm cooperating with said housing to at least partially define a motor chamber, said control means including a control valve, a control diaphragm connected with said housing and said control valve, said control diaphragm having a first side exposed to the fluid pressure in the upstream portion of the drain conduit and a second side which cooperates with said housing to at least partially define a control chamber, first and second control valve seats connected with said housing, said control valve including a first control valve portion movable into and out of engagement with said first control valve seat and a second control valve portion movable into and out of engagement with said second control valve seat, cabin air pressure conduit means for conducting aircraft cabin air pressure to said control chamber and to said first control valve seat, low pressure conduit means for conducting low pressure from the downstream portion of the drain conduit to said second control valve seat, motor conduit means for conducting fluid pressure from said first and second control valve seats to said motor chamber, said control valve being movable between a first position and a second position, said first control valve portion being spaced from said first control valve seat and said second control valve portion being disposed in engagement with said second control valve seat to enable cabin air pressure to be conducted through said cabin air pressure conduit means to said control chamber and to be conducted through said first control valve seat and said motor conduit means to said motor chamber to press said main valve member against said main valve seat and to block fluid flow through said second control valve seat when said control valve is in the first position, said second control valve portion being spaced from said second control valve seat and said first control valve portion being disposed in engagement with said first control valve seat to enable low pressure to be conducted from the downstream portion of the drain conduit through said low pressure conduit means to said second control valve seat and through said second control valve seat and said motor conduit means to said motor chamber to effect movement of said main valve member away from said main valve seat and to block fluid flow through said first control valve seat when said control valve is in the second position.

6. A valve assembly as set forth in claim 5 further including manually actuatable override means connected with said main valve member for enabling said main valve member to be manually moved away from said main valve seat.

7. A method of controlling a flow of liquid through a drain conduit in an aircraft, said method comprising the steps of pressing a main valve member against a main valve seat with a first force which is relatively small to enable liquid in the drain conduit to leak past the main valve member when the aircraft is in an inactive condition on the ground, pressing the main valve member against the main valve seat with a second force which is substantially greater than the first force to completely block liquid flow through the main valve seat when the aircraft is operating in the air above the ground, and moving the main valve member away from the main valve seat while the aircraft is operating in the air above the ground, said step of moving the main valve member away from the main valve seat being performed in response to the amount of liquid in the drain conduit upstream from the main valve seat exceeding a predetermined amount of liquid.

8. A valve assembly for use in an aircraft to control flow of liquid through a drain conduit, said valve assembly comprising a main valve seat through which liquid flows from a portion of the drain conduit upstream of the valve seat to a portion of the drain conduit downstream of the valve seat, a main valve member, fluid motor means connected with said main valve member and operable under the influence of fluid pressure to press said main valve member against said main valve seat, and control means for effecting operation of said motor means to move said main valve member away from said main valve seat when there is more than a predetermined amount of liquid in the upstream portion of the drain conduit to enable liquid to flow through the main valve seat from the upstream portion of the drain conduit to the downstream portion of the drain conduit, said control means including control valve means for connecting said motor means in fluid communication with the downstream portion of said drain conduit to effect operation of said motor means to move said main valve member away from said valve seat.

9. A valve assembly as set forth in claim 8 wherein said control means includes a control diaphragm connected with said control valve means, said control diaphragm having a first side exposed to fluid pressure in the upstream portion of the drain conduit and a second side which at least partially defines a control chamber, said control valve means including a first control valve portion movable into and out of engagement with a first control valve seat and a second control valve portion movable into and out of engagement with a second control valve seat, first conduit means for conducting fluid pressure to said control chamber and to said first control valve seat, second conduit means for conducting fluid pressure from the downstream portion of the drain conduit to said second control valve seat, motor conduit means for conducting fluid pressure from said first and second control valve seats to said motor means, said control valve means being operable between a first condition and a second condition, said first control valve portion being spaced from said first control valve seat and said second control valve portion being disposed in engagement with said second control valve seat to enable pressure to be conducted through said first conduit means to said control chamber and to be conducted through said first control valve seat and said motor conduit means to said motor means to press said main valve member against said main valve seat and to block fluid flow through said second control valve seat when said control valve means is in the first condition, said second control valve portion being spaced from said second control valve seat and said first control valve portion being disposed in engagement with said first control valve seat to enable pressure to be conducted from the downstream portion of the drain conduit through said second conduit means to said second control valve seat and through said second control valve seat and said motor conduit means to said motor means to effect movement of said main valve member away from said main valve seat and to block fluid flow through said first control valve seat when said control valve means is in the second condition.

10. A method of controlling a flow of liquid through a drain conduit in an aircraft, said method comprising the steps of blocking fluid flow through the conduit by maintaining a valve member disposed in the conduit in a closed condition with a first force when the aircraft is flying and there is less than a predetermined amount of liquid in the conduit upstream from the valve member, said step of maintaining the valve member in the closed condition includes conducting a first fluid pressure from a cabin of the aircraft to a fluid motor connected with the valve member, and enabling fluid to flow through the conduit by moving the valve member from the closed condition to an open condition when the amount of liquid in the conduit upstream from the valve member exceeds a predetermined amount of liquid and the aircraft is flying, said step of moving the valve member from the closed condition to the open condition includes blocking conduction of fluid pressure from the cabin of the aircraft to the fluid motor and conducting a second fluid pressure which is less than the first fluid pressure to the fluid motor from a location in the conduit downstream from the valve member.

* * * * *